US010602660B2

(12) United States Patent
Manji et al.

(10) Patent No.: US 10,602,660 B2
(45) Date of Patent: Mar. 31, 2020

(54) WORK VEHICLE

(71) Applicant: Kubota Corporation, Osaka-shi (JP)

(72) Inventors: Yasuhiro Manji, Sakai (JP); Katsuhiko Uemura, Sakai (JP); Kazuaki Matsuda, Sakai (JP)

(73) Assignee: Kubota Corporation, Osaka (JP)

( * ) Notice: Subject to any disclaimer, the term of this patent is extended or adjusted under 35 U.S.C. 154(b) by 159 days.

(21) Appl. No.: 15/826,781

(22) Filed: Nov. 30, 2017

(65) Prior Publication Data
US 2018/0338414 A1 Nov. 29, 2018

(30) Foreign Application Priority Data
May 24, 2017 (JP) .................................. 2017-102820

(51) Int. Cl.
*A01D 34/00* (2006.01)
*A01D 69/02* (2006.01)
(Continued)

(52) U.S. Cl.
CPC ........... *A01D 34/006* (2013.01); *A01D 34/00* (2013.01); *A01D 34/824* (2013.01); *A01D 69/02* (2013.01); *B60L 1/00* (2013.01); *B60L 15/007* (2013.01); *B60L 15/08* (2013.01); *B60L 15/2036* (2013.01); *B60L 50/50* (2019.02); *A01D 34/66* (2013.01); *A01D 2101/00* (2013.01);
(Continued)

(58) Field of Classification Search
CPC ...... A01D 34/78; A01D 34/006; A01D 34/00; A01D 34/824; A01D 34/466; A01D 69/02; B60L 50/50; B60L 1/00; B60L 1/003; B60L 15/007; B60L 15/08; B60L 15/2036; B60L 11/14
USPC .......... 56/10.2 A–10.2 G, 10.2 R, 15.2, 14.7, 56/12.1, 16.9
See application file for complete search history.

(56) References Cited

U.S. PATENT DOCUMENTS 6,192,665 B1 * 2/2001 Asselin ................ A01D 34/866
56/12.1
6,640,528 B1 * 11/2003 Rowland .............. A01D 34/866
56/15.2
(Continued)

FOREIGN PATENT DOCUMENTS

JP 2013251936 A 12/2013
JP 2013253510 A 12/2013
JP 2016198056 A 12/2016

*Primary Examiner* — Robert E Pezzuto
(74) *Attorney, Agent, or Firm* — The Webb Law Firm (57) ABSTRACT

A work vehicle includes an inverter circuit (42) configured to provide electric current to a traveling motor unit (21, 22) based on an inverter drive signal, a target signal generation unit (51) configured to generate a control target signal for the inverter circuit (42) based on an operation detection signal, an inverter drive signal generation section (41) configured to generate an inverter drive signal based on the control target signal and output the inverter drive signal to the inverter circuit (42), a trouble detection section (53) configured to detect a vehicle trouble based on a state detection signal, and a signal superposition section (56) configured to superpose a pulsatory signal on the control target signal if the trouble detection section (53) detects a vehicle trouble and output a resultant superposed control target signal to the inverter drive signal generation section (41).

6 Claims, 4 Drawing Sheets (51) Int. Cl.
  *B60L 50/50* (2019.01)
  *A01D 34/82* (2006.01)
  *B60L 1/00* (2006.01)
  *B60L 15/00* (2006.01)
  *B60L 15/08* (2006.01)
  *B60L 15/20* (2006.01)
  *A01D 34/66* (2006.01)
  *A01D 101/00* (2006.01)

(52) U.S. Cl.
  CPC ....... *B60L 2200/40* (2013.01); *B60L 2240/12* (2013.01); *B60L 2240/14* (2013.01); *B60L 2240/16* (2013.01); *B60L 2250/10* (2013.01); *B60L 2250/24* (2013.01); *B60L 2250/26* (2013.01)

(56) References Cited

U.S. PATENT DOCUMENTS

| | | | |
|---|---|---|---|
| 6,734,647 B2 * | 5/2004 | Wakitani | A01D 34/006 318/139 |
| 9,173,346 B2 * | 11/2015 | Koike | A01D 34/78 |
| 2011/0316466 A1 | 12/2011 | Uryu | |
| 2013/0307456 A1 | 11/2013 | Ono | |
| 2013/0320905 A1 | 12/2013 | Uryu | |
| 2014/0059990 A1 | 3/2014 | Fujiwara et al. | |
| 2016/0295797 A1 | 10/2016 | Ito et al. | |

* cited by examiner

WORK VEHICLE

CROSS-REFERENCE TO RELATED APPLICATION

This application claims priority to Japanese Patent Application No. 2017-102820 filed May 24, 2017, the disclosure of which is hereby incorporated in its entirety by reference.

BACKGROUND OF THE INVENTION

1. Field of the Invention

This invention relates to a work vehicle. More particularly, the invention relates to a work vehicle having a man-operable tool for adjusting, with using an inverter circuit, an electric current to be supplied to a traveling motor unit that drives drive wheels. It is understood however that the present invention is not limited thereto.

2. Description of the Related Art

JP2016-198056A (US2016/0295797A1) discloses that when a driver operates a pair of right and left maneuvering levers, rotational speeds of right and left wheel motors are adjusted, whereby an electrically powered grass mower is caused to travel straight or make a turn. Based on an operation amount of the maneuvering lever detected by a maneuvering angle sensor, a speed calculation section obtains a rotational speed of a wheel, namely, a rotational speed value of the motor. When this rotational speed value of the motor obtained by the speed calculation section is given to an inverter, an electric power required for realizing this rotational speed value is generated and fed to the motor.

In the case of a work vehicle mounting a battery as its drive source, such trouble as flat (dead) battery, an abnormal rise of the motor temperature, etc. should be avoided before its occurrence. Otherwise, there will develop such inconvenience as stop of the work vehicle during a utility work. For this reason, conventionally, a work vehicle such as a grass mower is provided with a function of reporting trouble information which needs to be checked by the driver. For instance, a grass mower disclosed in JP2013-253510A (US2014/0059990A1) includes a flat panel display, on which conditions such as battery charge, parking brake, headlamp, PTO clutch, cooling water temperature, remaining fuel amount, are displayed by LED. For example, in response to reduction in the remaining fuel amount, a remaining fuel amount alarm will be displayed thereon.

JP2013-251936A (US2013/0320905A1) discloses an electric power steering device having a plurality of inverter units, a plurality of electric power relays and a control unit. According to the configuration of the control unit, after it is determined that a trouble has developed in a first line, a second inverter included in a second line which is presently normal will be controlled to allow vibration to be generated in an output torque of the motor, and the output torque will be progressively increased. With this, while the driving of the motor is continued by the second line, occurrence of the device trouble is caused to be sensed by the driver.

In the case of occurrence of trouble in a work vehicle disclosed in JP2016-198056A (US2016/0295797A1), the arrangement of reporting the vehicle trouble by means of LED, a lamp, etc. is known in the art as provided in the work vehicle disclosed in JP2013-253510A (US2014/0059990A1). Alarm by means of a buzzer or a sound is also known in the art. However, for a work vehicle such as a grass mower, such alarm sound can be made inaudible by work noise. Further, visual alarm using LED, a lamp or the like can be overlooked by the driver who is preoccupied with an ongoing working situation.

For this reason, it is conceivable to introduce an alarming system such as one disclosed in JP2013-251936A (US2013/0320905A1). However, with this alarming system, a vibration signal is to be added in the control system of inverter, so modification is needed in the inverter control system. In general, since such inverter control system is provided in the form of an integrated unit as an inverter drive module, such modification noted above will involve high cost increase.

In view of the current state of the art described above, there is a need for an improved work vehicle having an arrangement applicable to the above-noted work vehicle which can solve the troubles of driver's failure to notice, i.e. to hear or see the trouble occurrence sign, but can cause the driver to take notice of the vehicle trouble by mon-auditory and non-visual bodily sensation. Then, there is proposed a work vehicle as follows.

SUMMARY OF THE INVENTION

Therefor a work vehicle as under is proposed:

A work vehicle comprising:

a traveling motor unit configured to provide a rotational power to a drive wheel unit;

an inverter circuit configured to provide electric current to the traveling motor unit based on an inverter drive signal;

a man-operable tool for adjusting the rotational power of the traveling motor unit;

an operation amount sensor configured to detect an operation amount of the man-operable tool and output an operation detection signal;

a target signal generation unit configured to generate a control target signal for the inverter circuit based on the operation detection signal;

an inverter drive signal generation section configured to generate an inverter drive signal based on the control target signal and output the inverter drive signal to the inverter circuit;

a vehicle state detection section configured to detect a vehicle state and output a state detection signal;

a trouble detection section configured to detect a vehicle trouble based on the state detection signal; and a signal superposition section configured to superpose a pulsatory signal on the control target signal if the trouble detection section detects a vehicle trouble and output a resultant superposed control target signal to the inverter drive signal generation section.

In the present description, the term "pulsatory signal" is intended to refer broadly to any signal capable of creating a certain convex or concave, or convex and concave portion in a base signal when being superposed on at least a portion of the based signal. As some non-limited specific, i.e. exemplary, waveforms of such pulsatory signal, a sine wave, a saw tooth wave, a rectangular wave, can be cited and its frequency (period) can be constant or non-constant.

With the above-described arrangement, in order to cause the driver to sense a vehicle trouble detected by the trouble detection unit, a vehicle behavior based on the driver's operation on the man-operable tool is positively made different from that under a normal state. More specifically, upon detection of a vehicle trouble to be alarmed, a pulsatory signal is superposed on the control target signal which is generated from an operation detection signal outputted according to an operation amount of the man-operable tool.

With this, due to the presence of pulsation occurring in the control target signal used as the control target value for the inverter circuit, the inverter drive signal outputted from the inverter circuit will be pulsated correspondingly. This pulsated inverter drive signal causes a corresponding pulsation in the motor rotation, which then can be sensed as unnatural feel in the vehicle behavior by the driver which is not felt at the time of operation under normal vehicle behavior. With this, the driver is effectively made aware of occurrence of certain vehicle trouble. According to the above arrangement, a pulsatory signal is superposed on the control target signal based on the operation of the man-operable tool and given to the inverter circuit. Therefore, there is no need at all to modify the inverter circuit per se. Namely, it is possible to realize a vehicle trouble alarming technique that can solve the inconvenience of driver's failure to see or hear alarming sign and case make the driver aware via bodily sensation, without any need to modify the inverter control system.

According to one preferred embodiment, the work vehicle further comprises a pulsation adjustment section configured to adjust amplitude and/or frequency of the pulsatory signal.

With the above arrangement, in a situation where the driver encounters certain difficulty in bodily sensing the unnatural vehicle behavior created by the pulsatory signal superposition, e.g. during a utility work accompanied by significant amount of working noise/vibration or during traveling on an undulated ground/road surface, in order to allow the driver to sense the unnaturalness in a reliable manner, the amplitude and/or frequency of the pulsatory signal are (is) adjusted appropriately, whereby the driver can be made aware of the alarming of vehicle trouble in a reliable manner.

When an operation amount of the man-operable tool is increased and the vehicle speed is increased correspondingly, vibration of the vehicle will be also increased correspondingly. This will present difficulty for the driver to bodily sense the vehicle behavior created by the superposition of the pulsatory signal. For this reason, according to one preferred embodiment, the pulsation adjustment section is configured to increase the amplitude of the pulsatory signal as the operation amount of the man-operable tool is increased.

One example of the work vehicle is a grass mower including a mower unit having a drive cutter blade as an implement and configured to effect a grass cutting operation by driving the cutter blade while traveling. In the case of such grass mower, during a working traveling when the cutter blade is being driven, the driver will be exposed to greater vibration and noise than the case of non-working traveling when the cutter blade is not driven. For this reason, it is desired that the pulsatory signal which is superposed at the time of occurrence of vehicle trouble can make the unnaturalness of vehicle behavior more conspicuous. Namely, it is preferred that the pulsatory signal to be superposed be more effective during the working traveling than during the non-working traveling.

For this reason, according to one preferred embodiment:
the work vehicle is configured to allow mounting of a mower unit having a drive cutter blade as an implement (work implement); and
the pulsation adjustment section is configured to adjust the amplitude and/or frequency of the pulsatory signal according to driving or non-driving of the mower unit.

In the case of an electrically powered work vehicle, flat battery or overheat of the motor involves sudden stop of the vehicle, so it is necessary to alarm the driver before actual occurrence of such situation. For this reason, according to one preferred embodiment:
the vehicle trouble includes battery remaining charge reduction and motor temperature rise; and
the pulsation adjustment section is configured to render the greater the amplitude of the drive signal, the higher degree of battery remaining charge reduction and/or the motor temperature rise.

The above-described arrangement can increase the possibility of avoiding sudden stop of the vehicle due to flat battery or overheating of motor.

According to one preferred embodiment:
the traveling motor unit includes a left motor for driving a left drive wheel and a right motor for driving a right drive wheel; and
the man-operable tool includes a left maneuvering lever for adjusting a rotational force of the left motor and a right maneuvering lever for adjusting a rotational force of the right motor.

With the work vehicle having the above-described arrangement, by generating pulsation in both the left motor which drives the left drive wheel and the right motor which drives the right drive wheel, unnaturalness of vehicle behavior is created, thus increasing the possibility of the driver's taking notice of vehicle trouble occurrence. Needless to say, it is also possible to employ an arrangement wherein the pulsatory signal is superposed for only either one of the left motor and the right motor, namely, to only the control target signal by either one of the left maneuvering lever and the right maneuvering lever.

Further and other features and advantageous effects achieved thereby will become apparent upon reading the following explanation with reference to the accompanying drawings.

DETAILED DESCRIPTION OF PREFERRED EMBODIMENTS

Figure 1:
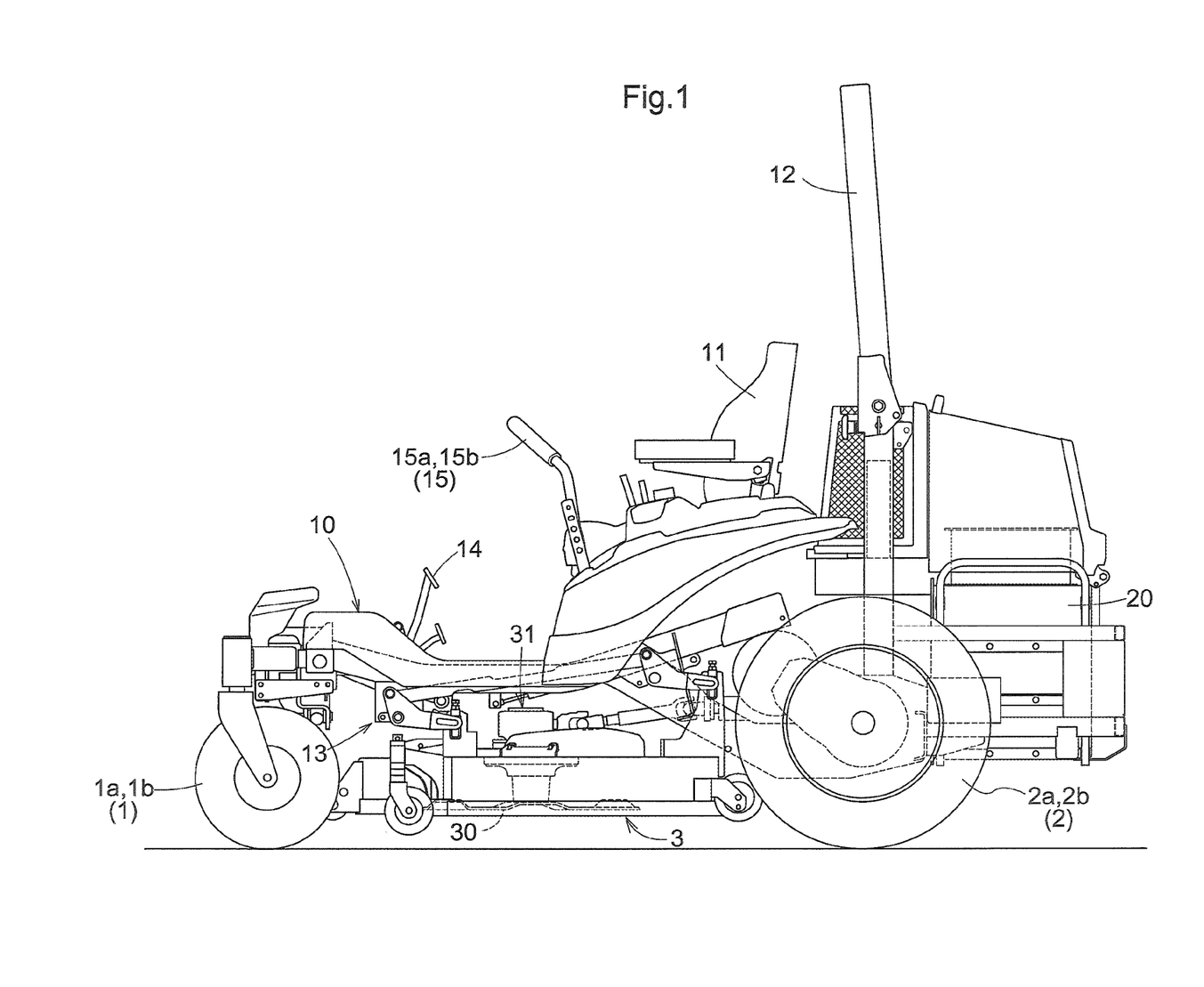
FIG. 1 is a view showing one embodiment, which is a side view showing a grass mower as one example of a work vehicle.
Figure 2:
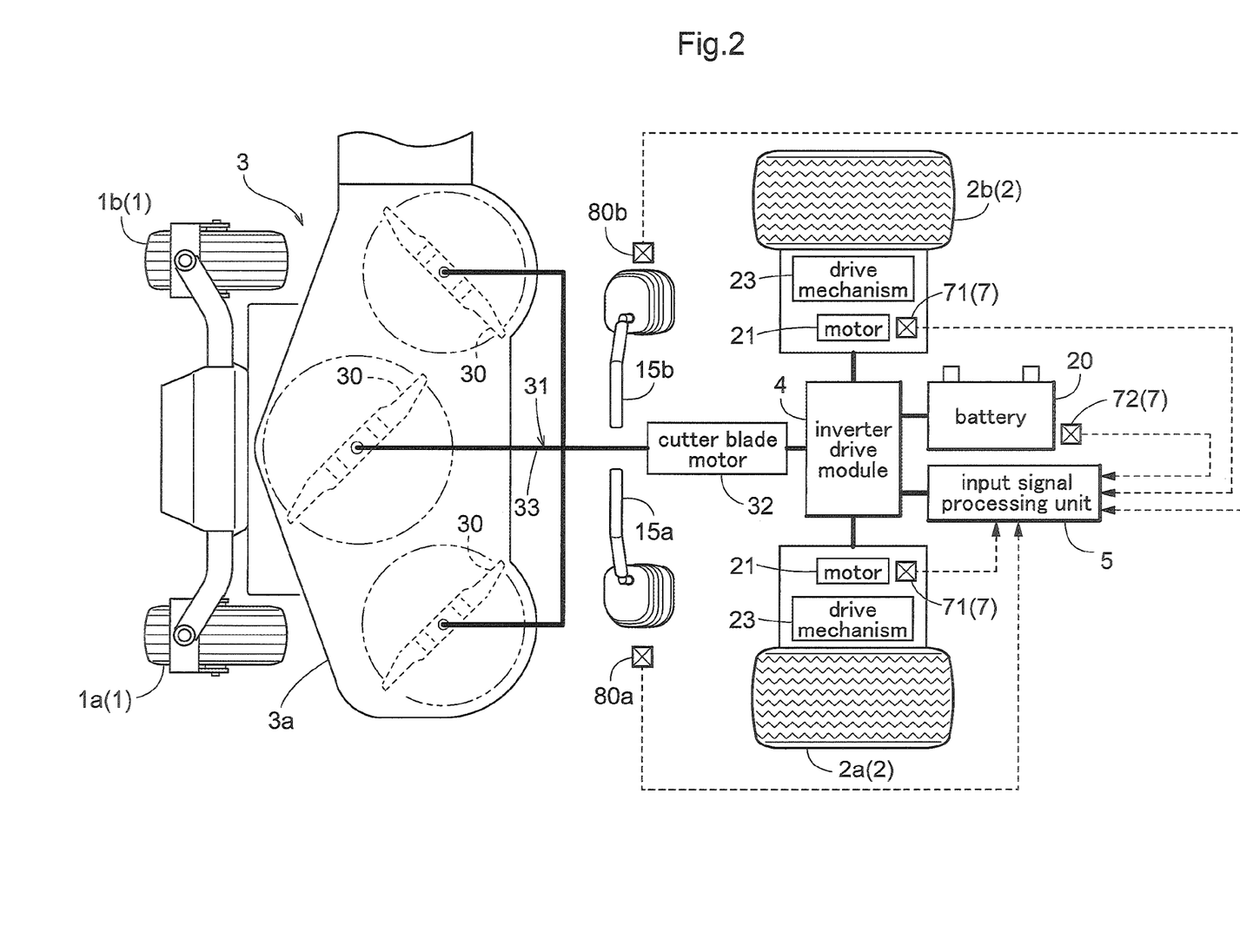
FIG. 2 is a system diagram showing an electric system and a power system of the grass mower.

Next, with reference to the accompanying drawings, one embodiment of a work vehicle will be described. In this embodiment, the work vehicle comprises a riding-type grass mower (to be referred to simply as a "grass mower" hereinafter) having a mower unit 3 (an example of an "implement" (work implement)) mounted on its vehicle body 10. FIG. 1 is a side view of the grass mower. FIG. 2 is a diagram schematically showing an electric system and a power system of the grass mower.

[General Configuration]

This grass mower includes a front wheel unit 1 consisting of a left front wheel 1*a* and a right front wheel 1*b* which are steerable caster wheels, a drive wheel unit 2 consisting of a left rear wheel (left side drive wheel) 2*a* and a right rear wheel (right side drive wheel) 2*b*, a vehicle body 10 supported by the front wheel unit 1 and the rear wheel unit 2, a battery 20 disposed at a rear portion of the vehicle body 10, a driver's seat 11 disposed forwardly of the battery 20, and a ROPS (rollover protection structure) frame 12 mounted erect rearwardly of the driver's seat 11. A mower unit 3 is suspended from the vehicle body 10 via a link mechanism 13 in a lower space of the vehicle body 10 between the front wheel unit 1 and the rear wheel unit 2.

Forwardly of the driver's seat 11, there is provided a floor plate which forms a foot rest for a driver; and from this plate, a brake pedal 14 protrudes. On the opposed sides of the driver's seat 11, there is provided a man-operable tool 15 consisting of a left maneuvering lever 15a and a right maneuvering lever 15b which are pivotable about a horizontal pivot axis extending in a vehicle body transverse direction.

[Electric System and Power System of Grass Mower]

As shown in FIG. 2, there are mounted a left motor 21 and a right motor 22 which together constitute a traveling motor unit configured to supply rotational power to the left rear wheel 2a and the right rear wheel 2b. The left motor 21 and the right motor 22 provide rotational speeds which are variable independently of each other according to electric powers supplied thereto via an inverter drive module 4. Therefore, it is possible to make rotational speeds of the left rear wheel 2a and the right rear wheel 2b different from each other. And, such speed difference between the right and left rear wheels provides a turn of the grass mower. Incidentally, in the instant embodiment, for implementing power transmission between the left motor 21 and the left rear wheel 2a and between the right motor 22 and the right rear wheel 2b, traveling drive mechanisms 23 are provided respectively therefor. In case the left motor 21 and the right motor 22 comprise in-wheel motors, such drive mechanisms 23 can be omitted.

In the instant embodiment, as shown in FIG. 2, the mower unit 3 is configured as a side-discharge type having three cutter blades (blades), and includes a mower deck 3a and three rotary cuter blades 30. A cutter blade drive mechanism 31 for rotatably driving the cutter blades 30 is comprised of a cutter blade motor 32 which is an electric actuator and a cutter blade power transmission mechanism 33 configured to transmit power of the cutter blade motor 32 to the cutter blades 30.

When the grass mower is caused to travel while rotating the cutter blades 30, grass clippings generated by cutting operation of the cutter blades 30 will be conveyed by an air current generated by air current generating blades of the cutter blades 30 with an aid of a baffle plate inside the mower deck 3a to one lateral side where a discharge opening is provided, and then discharged through the discharge opening provided at this one lateral side to the lateral outer side of the mower deck 3a.

As shown in FIG. 2, power supply to the left motor 21 and the right motor 22 for traveling and to the cutter blade motor 32 for grass cutting is effected by the inverter drive module 4. For this reason, the inverter drive module 4 is connected to the battery 20. Incidentally, in the instant embodiment, power supply to the cutter blade power 32 is also effected by the inverter drive module 4.

The inverter drive module 4 outputs driving currents to the left motor 21 and the right motor 22 based on control target signals from an input signal processing unit 5. In order to generate such control target signals, the inverter drive module 4 receives inputs of an operation detection signal from a left maneuvering angle detection sensor 80a (an example of "operation amount detection sensor 80") for detecting a pivoting angle of the left maneuvering lever 15a and an operation detection signal from a right maneuvering angle detection sensor 80b (an example of "operation amount detection sensor 80") for detecting a pivoting angle of the right maneuvering lever 15b. The inverter drive module 4 further receives inputs of state detection signals from a vehicle state detection section 7 such as a temperature detection section 71 for detecting motor temperatures of the left motor 21 and the right motor 22, and a battery remaining charge detection section 72 for detecting remaining battery charge.

With this grass mower, in order to alarm a driver of a vehicle trouble detected based on a state detection signal from the vehicle state detection section 7, at the time of occurrence of a predetermined vehicle trouble, a vehicle behavior (behavior of the grass mower) realized in response to an operation on the left maneuvering lever 15a or the right maneuvering lever 15b, each acting as a "man-operable tool 15", is made positively different from that under a normal state. For instance, an example of such different vehicle behavior is unsmooth or jerky vehicle movement created by pulsation occurring in the traveling of the grass mower. By bodily sensing such vehicle behavior proving unnaturalness, the driver is made aware of the vehicle trouble.

[Basic Flow of Alarm Control]

Figure 3:
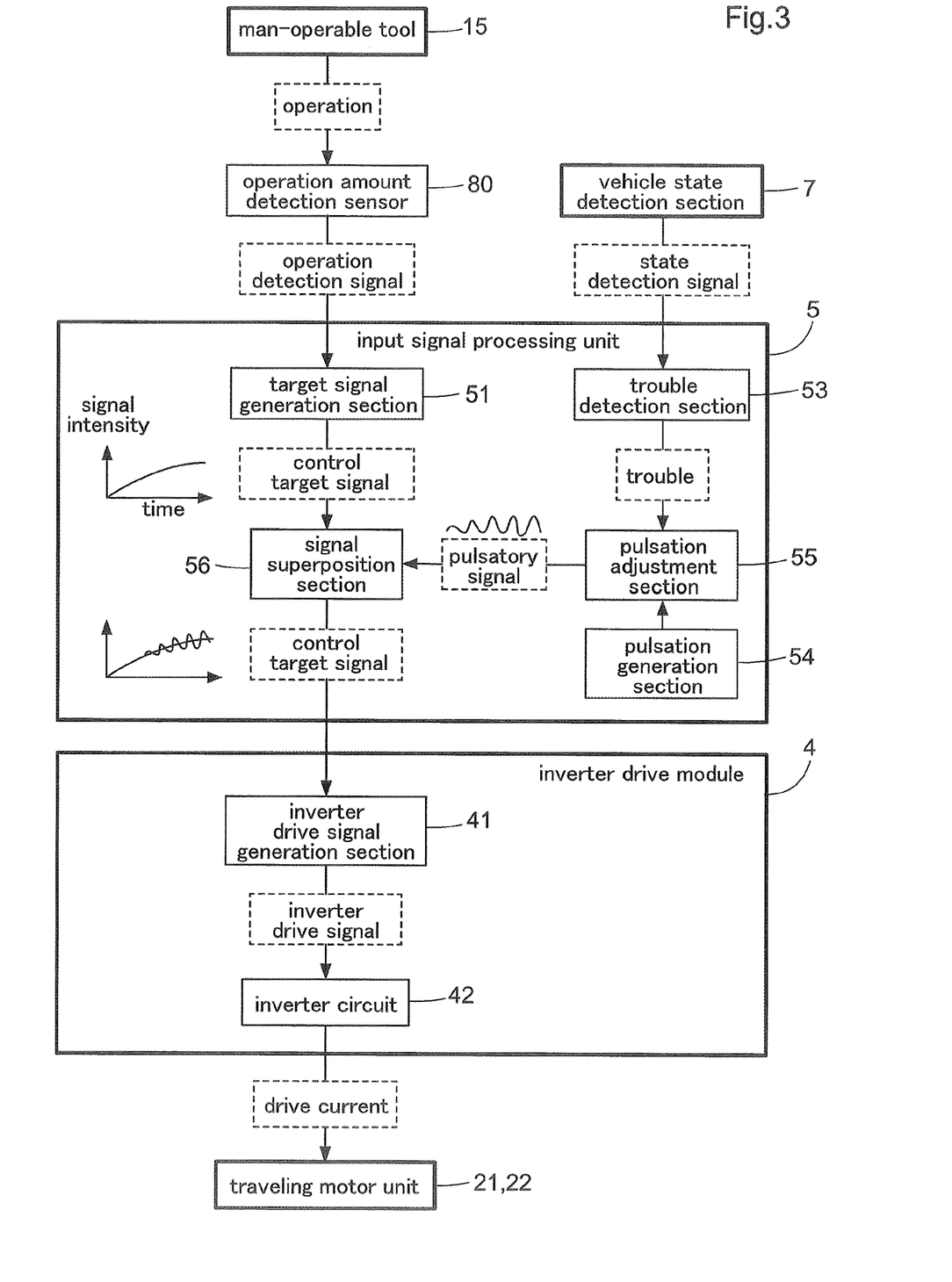
FIG. 3 is an explanatory view showing a basic flow of an alarm control provided for making a driver aware of occurrence of vehicle trouble.

FIG. 3 shows a basic flow of control for making the driver aware of vehicle trouble by way of bodily feel. Next, with reference to this FIG. 3, a flow of bodily recognition of vehicle trouble will be described schematically.

With this grass mower, based on an operation amount of the man-operable tool 15, rotational powers of the traveling motor unit consisting of the left motor 21 and the right motor 22 are adjusted. The operation amount detection sensor 80 (shown as pair of right and left operation amount sensors 30a, 30b in the drawings accompanying the embodiment) gives an operation detection signal obtained by detection of an operation amount of the man-operable tool 15 to the input signal processing unit 5. Then, based on the operation detection signal, the input signal processing unit 5 generates control target signals for the left motor 21 and the right motor 22 and provides these target signals to the inverter drive module 4. Based on the control target signals inputted thereto, the inverter drive module 4 controls inverters to provide drive currents to the left motor 21 and the right motor 22 for driving the left motor 21 and the right motor 22, respectively.

A vehicle trouble that may occur in the grass mower is detected by the input signal processing unit 5 based on a state detection signal outputted from the vehicle state detection section 7. Upon detection of a vehicle trouble, the input signal processing unit 5 generates a pulsatory signal and superposes this pulsatory signal on the control target signal generated based on the operation detection signal. With this, the inverter drive module 4 executes an inverter control with using the superposed control target signal as an input signal, and supplies inverter-outputted drive currents to the left motor 21 and the right motor 22. These drive currents contain the pulsatory signal component. Therefore, the rotations of the left motor 21 and the right motor 22 driven by the drive current (and thus the rotations of the left rear wheel 2a and the right rear wheel 2b) will contain the pulsatory signal component, which renders the movement of the grass mower unsmooth or jerky. Then, by feeling such unnatural movement of the grass mower, the driver can recognize the occurrence of the vehicle trouble.

[Functional Sections Constructed in Control System]

Figure 4:
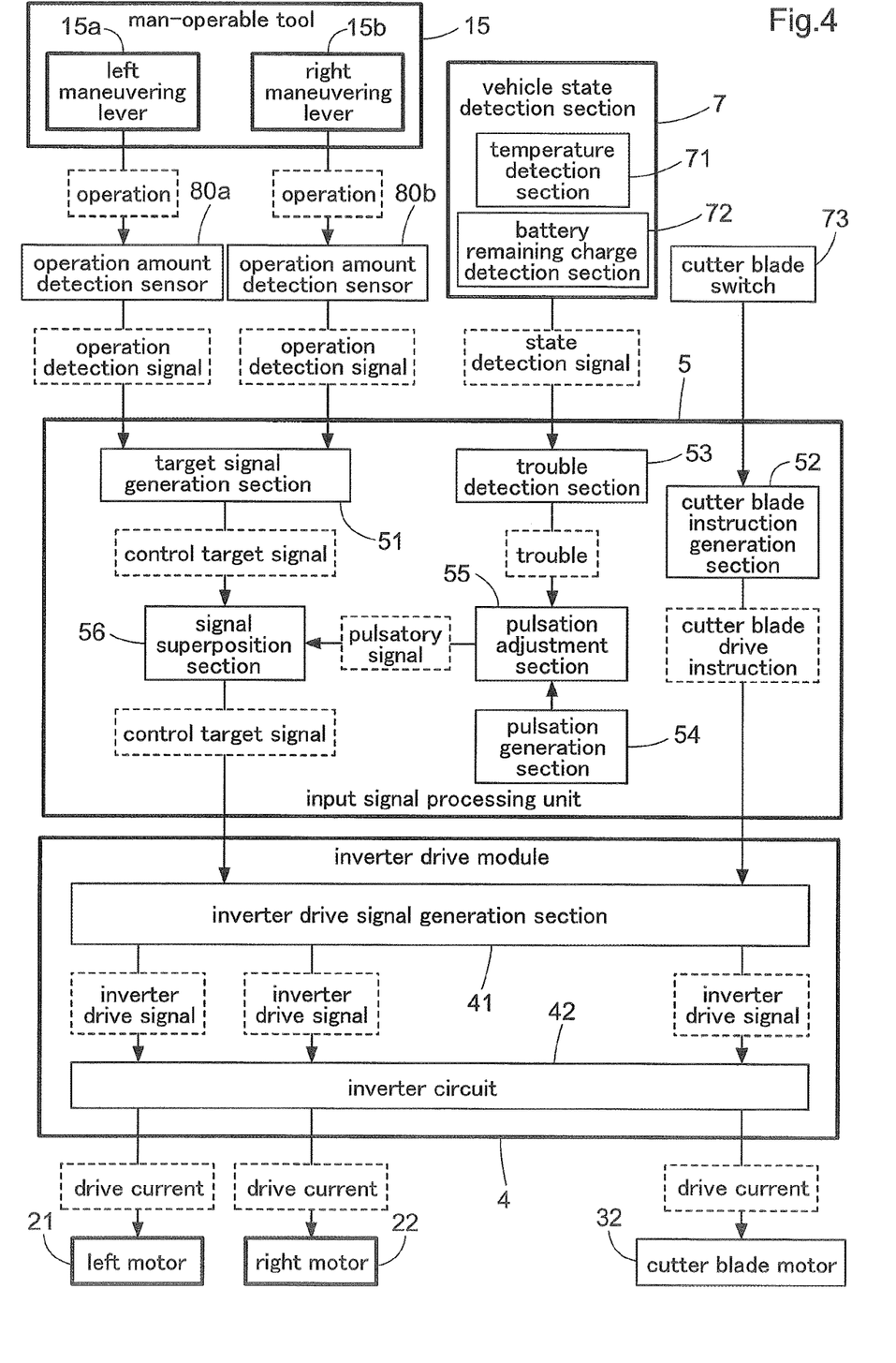
FIG. 4 is a functional block diagram of a control system of the grass mower.

Next, functional sections configured in the control system of this grass mower will be described. The functional block diagram of FIG. 4 illustrates one example of the control system for realizing the vehicle trouble control described hereinbefore with reference to FIG. 3.

This control system consists essentially of the input signal processing unit 5 and the inverter drive module 4. The input signal processing unit 5 processes detection signals from sensors, switches, etc. and converts them into a predetermined signal format and gives resultant signals to the inverter drive module 4.

[Input Signal Processing Unit]

The input signal processing unit 5 is connected to the operation amount detection sensor 80a for detecting an operation amount of the left maneuvering lever 15a and outputs an operation detection signal, and to the operation amount detection sensor 80b for detecting an operation amount of the right maneuvering lever 15b and outputs an operation detection signal. The input signal processing unit 5 is connected also to the vehicle state detection section 7 and a cutter blade switch 73. The vehicle state detection section 7 includes the temperature detection section 71 for detecting motor temperatures of the left motor 21 and the right motor 22 and outputting the detected temperatures as state detection signals; and the battery remaining charge detection section 72 for detecting remaining battery charge and outputting the result as a state detection signal. The cutter blade switch 73 is a switch for switching ON/OFF of driving of the cutter blade motor 32.

The input signal processing unit 5 includes a target signal generation section 51, a cutter blade drive instruction generation section 52, a trouble detection section 53, a pulsatory signal generation section 54, a pulsation adjustment section 55 and a signal superposition section 56. The target signal generation section 51 generates a control target signal to be given to the inverter drive module 4, based on the operation detection signals from the operation amounts detection sensors 80a, 80b. The cutter blade drive instruction generation section 52 generates a cutter blade drive instruction (rotation instruction/stop instruction) to be given to the inverter drive module 4, based on an ON/OFF signal from the cutter blade switch 73.

The trouble detection section 53 detects a vehicle trouble such as a battery remaining charge reduction or motor temperature rise, based on the state detection signal from the vehicle state detection section 7. The pulsation generation section 54 generates a pulsatory signal. In the instant embodiment, this pulsatory signal is a trigonometric function wave whose amplitude increases with lapse of time and can be represented by:

$$A(t)*\sin(\omega t) \text{ [i.e. ``}A(t)\text{'' multiplied by ``}\sin(\omega t)\text{'']}.$$

Needless to say, the amplitude can be constant and the frequency (period) can vary with lapse of time. The pulsation adjustment section 55 adjusts a basic pulsatory signal given from the pulsation generation section 54, and converts the adjusted signal into a format available to and useable by the signal superposition section 56. Further, the pulsation adjustment section 55 can adjust the pulsatory signal such that the form of the pulsatory signal is made different depending on a type of vehicle trouble detected by the trouble detection section 53. For instance, in the case of occurrence of vehicle trouble such as battery remaining charge reduction or motor temperature rise, the pulsation adjustment section 55 can render the amplitude the greater, the higher the degree of such battery remaining charge reduction or motor temperature rise.

Further, the pulsation adjustment section 55 can adjust the pulsatory signal in such a manner that the amplitude of the pulsatory signal is increased in association with increase of the operational amount of the left maneuvering lever 15a and the right maneuvering lever 15b. Still further, the pulsation adjustment section 55 can adjust the amplitude and/or frequency (period), in accordance with driving (ON operation of the cutter blade switch 73) or non-driving (OFF operation of the cutter blade switch 73) of the mower unit 3. For practical purpose, since vibration generated at the mower unit 3 will be transmitted to the vehicle body 10, it is preferred that the ratio of the pulsatory signal relative to the control target signal be made higher. Incidentally, in case the signal superposition section 56 uses the pulsatory signal outputted from the pulsation generation section 54 as it is (i.e. without adjustment thereof), the pulsation adjustment section 55 may be omitted.

When the trouble detection section 53 detects a vehicle trouble and outputs the vehicle trouble occurrence information, the signal superposition section 56 superposes the pulsatory signal on the control target signal outputted from the target signal generation section 51. With this, at the time of occurrence of vehicle trouble, a control target signal superposed with the pulsatory signal is inputted to the inverter drive module 4, as a control target signal.

[Inverter Drive Module]

The inverter drive module 4 includes an inverter drive signal generation section 41 and an inverter circuit 42. The inverter drive signal generation section 41 generates an inverter drive signal for driving the inverter circuit 42, based on the control target signal transmitted from the input signal processing unit 5. In case the control target signal has been superposed with a pulsatory signal, the pulsatory signal component is contained in the inverter drive signal also. Based on the inverter drive signal, the inverter circuit 42 effects an inverter operation and generates a drive current. Incidentally, for the control target signal and the inverter drive signal, such signals are handled independently of each other for signals for the left motor 21 and the signals for the right motor 22; and the drive currents will be fed to the left motor 21 and the right motor 22, respectively. Whereby, the left rear wheel 2a and the right rear wheel 2b will be driven to rotate in correspondence with the respective operation amounts of the left maneuvering lever 15a and the right maneuvering lever 15b. Incidentally, as a mode of driving control for the left motor 21 and the right motor 22 implemented by the inverter drive module 4, a speed control and/or torque control can be employed.

A cutter blade drive instruction from the cutter blade drive instruction generation section 52 is also given to the inverter drive module 4. In response to the cutter blade drive instruction, the inverter drive signal generation section 41 generates an inverter drive signal which activates the inverter circuit 42. Then a drive current generated at the inverter circuit 42 is fed to the cutter blade motor 32, whereby the cutter blade motor 32 is driven to rotate. Incidentally, at the time of occurrence of vehicle trouble, it is possible to employ an arrangement of superposing the pulsatory signal on the inverter drive signal for the cutter blade motor 32.

Other Embodiments

The arrangements disclosed in the foregoing embodiment and other embodiments to follow can be used in any combination as long as no contradiction results from such combination. Further, all the embodiments disclosed herein are presented to be illustrative. Embodiments of the present invention are not limited thereto, but appropriate modifications thereof will be possible within a range not deviating from the essential spirit of the present invention.

(1) In the foregoing embodiment, the traveling motor unit for which the pulsatory signal is superposed at the time of vehicle trouble occurrence includes the left motor 21 for driving the left rear wheel 2a and the right motor 22 for driving the right rear wheel 2b. Instead of this, the traveling motor unit can be comprised of a signal motor, with an output line of this motor being branched to the right and left sides, each line incorporating a drive mechanism 23 having a stepless speed changer. In this arrangement, a speed position of the respective speed changer will be adjusted by the left maneuvering lever 15a and/or the right maneuvering lever 15b, whereby the grass mower will be maneuvered accordingly.

(2) In the foregoing embodiment, there was disclosed a work vehicle of the so-called zero-turn type, according to which the left rear wheel 2a and the right rear wheel 2b of the drive wheel unit 2 can be driven independently of each other. Alternatively, the work vehicle can be configured such that the left rear wheel 2a and the right rear wheel 2b are coupled with each other via a differential mechanism. In this case too, the traveling motor unit will be comprised of a single motor. In this case, in general, a steering wheel will be employed as the man-operable tool 15, and thus each of the operation detection signal and the control target signal will be comprised of a single signal.

(3) The division of the respective functional sections illustrated in FIG. 3 and FIG. 4 is only one example for facilitating explanation. These various functional sections can be combined or a signal functional section can be divided into a plurality of sections, as described if necessary or appropriate.

(4) In the foregoing embodiment, the work vehicle is configured as a mid-mount type with the mower unit 3 being mounted between the front wheels and the rear wheels. Alternatively, the work vehicle can be a front-mower type grass mower, with the mower unit 3 being disposed forwardly of the front wheels. Further, the present invention is applicable also to such agricultural machine as a tractor, a combine and a rice planter, and also to a civil engineering machine.

What is claimed is:

1. A work vehicle comprising:
a traveling motor unit configured to provide a rotational power to a drive wheel unit;
an inverter circuit configured to provide electric current to the traveling motor unit based on an inverter drive signal;
a man-operable tool for adjusting the rotational power of the traveling motor unit;
an operation amount sensor configured to detect an operation amount of the man-operable tool and output an operation detection signal;
a target signal generation unit configured to generate a control target signal for the inverter circuit based on the operation detection signal;
an inverter drive signal generation section configured to generate an inverter drive signal based on the control target signal and output the inverter drive signal to the inverter circuit;
a vehicle state detection section configured to detect a vehicle state and output a state detection signal;
a trouble detection section configured to detect a vehicle trouble based on the state detection signal; and
a signal superposition section configured to superpose a pulsatory signal on the control target signal if the trouble detection section detects a vehicle trouble, and to output a resultant superposed control target signal to the inverter drive signal generation section.

2. The work vehicle according to claim 1, further comprising a pulsation adjustment section configured to adjust at least one of amplitude or frequency of the pulsatory signal.

3. The work vehicle according to claim 2, wherein the pulsation adjustment section is configured to increase the amplitude of the pulsatory signal as the operation amount of the man-operable tool is increased.

4. The work vehicle according to claim 2, wherein:
the work vehicle is configured to allow mounting of a mower unit having a drive cutter blade as an implement; and
the pulsation adjustment section is configured to adjust at least one of the amplitude or frequency of the pulsatory signal according to driving or non-driving of the mower unit.

5. The work vehicle according to claim 2, wherein:
the vehicle trouble includes battery remaining charge reduction and motor temperature rise; and
the pulsation adjustment section is configured to render the greater the amplitude of the drive signal, the higher degree of at least one of the battery remaining charge reduction or the motor temperature rise.

6. The work vehicle according to claim 1, wherein:
the traveling motor unit includes a left motor for driving a left drive wheel and a right motor for driving a right drive wheel; and
the man-operable tool includes a left maneuvering lever for adjusting a rotational force of the left motor and a right maneuvering lever for adjusting a rotational force of the right motor.

* * * * *